United States Patent Office 2,967,127
Patented Jan. 3, 1961

2,967,127

TOXICANT CARRIER AND PESTICIDAL COMPOSITION CONTAINING SAME

Edgar W. Sawyer, Jr., Metuchen, and James A. Polon, Milltown, N.J., assignors to Minerals & Chemicals Philipp Corporation, a corporation of Maryland No Drawing. Filed May 29, 1957, Ser. No. 662,339

6 Claims. (Cl. 167—42)

This invention relates to a novel, particulate composition adapted to function as a carrier for a thiophosphate-type toxicant and to pesticidal compositions including the same.

Thiophosphate-type toxicants have the general structural formula:

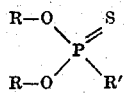

One of the most important members of this class of toxicants is malathion, S-(1,2-dicarbethoxyethyl)-O,O-dimethyl dithiophosphate, in which R is $CH_3$ and R' is

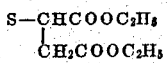

In Thimet (O,O-diethyl(S-ethyl-mercaptomethyl)dithiophosphate), R is $CH_3CH_2$ and R' is $S-C_2H_4-S-C_2H_5$; parathion is closely related, R being $C_2H_5$ and R' being $OC_6H_4NO_2$. Thiophosphate-type toxicants of the structure set forth are widely used in agriculture because of their high kill and relatively high vapor pressure. It is frequently desirable to supply these toxicants as dry formulations, such as, dusts, wettable powders and granular compositions, in which the toxicant is sorbed on the surface of a chemically inert, particulate, mineral carrier and is readily released thereby when the composition is applied to crops. Frequently these initial compositions are further diluted or "let-down" with low sorptive, particulate materials such as gypsum, talc, kaolinite and diatomaceous earth. The desiderata of an ideal mineral carrier are low cost, good flow properties, low bulk density, high sorptivity for the toxicant and negligible effect on the potency of the active ingredient impregnated thereon over prolonged storage of the composition. It has been found that some highly sorptive clays such as attapulgite (palygorskite), certain montmorillonite clays, mixtures of these clays, or mixtures of these clays with other clay minerals, such as kaolinitic clays, and kaolinite have a strong tendency to catalyze the decomposition of a thiophosphate-type toxicant sorbed on the clay surface whereby the resultant insecticidal compositions have only a short shelf life; after a few months of storage such compositions have inadequate insecticidal potency.

It is a primary object of the invention to provide a novel method for deactivating the surface of a sorptive clay so that a thiophosphate-type toxicant impregnated thereon has high stability and a prolonged storage life.

It is another object of the invention to condition a solid carrier for a thiophosphate-type toxicant with a combination of deactivating additives for the purpose set forth above, each additive acting as an adjuvant to the other additives.

Another object of the invention is the preparation of stable particulate pesticidal compositions including a thiophosphate-type toxicant.

Other objects will be apparent from a reading of the following description of the invention.

In brief, our invention contemplates the addition of a novel combination of additives to a sorptive clay to inhibit the tendency of the surface of that clay to catalyze the decomposition of a thiophosphate-type toxicant impregnated thereon.

More specifically, according to the teachings of the invention, a sorptive clay in a powdered or granular state is treated with ethyl silicate and at least one of the two following additives: a nonfugitive oxygen containing organic compound and an antioxidant. It has been found that the additives when thus added in combination to form a deactivator are adjuvants to each other, each additive enhancing the potency of the other additives as a deactivating agent for the clay. The deactivating additives may be added to the carrier prior to or simultaneously with the impregnation with the thiophosphate-type toxicant.

It is very important that the components of the deactivator be very thoroughly admixed with the carrier so that no destructive sites on the carrier surface are available to promote the deterioration of the toxicant. Particularly when very small quantities of deactivator are used it may be desirable to add a solvent for the deactivator additives to ensure their thorough distribution on the clay surface.

The practices taught herein are particularly beneficial when applied to attapulgite clay, whose high sorptivity, low bulk density, superior flow characteristics, low price and ability to readily release sorbed material, make it a highly desirable carrier for a thiophosphate-type toxicant when the tendency of the material to catalyze the decomposition of the toxicant sorbed thereon is minimized. The practices herein taught may be beneficially applied to certain montmorillonite clays.

The additives chosen from the class of materials including nonfugitive oxygen containing organic compounds include glycols, polyethylene glycols, such as diethylene glycol, triethylene glycol and triethylene glycol n-butyl ether, and may include other related compounds such as dipropylene glycol methyl ether, Cellosolves and Carbitols.

The antioxidants preferably include those having some solubility on the component of the deactivator which is a liquid. When a glycol is used in formulating the deactivator, suitable antioxidants include thiourea, hydroquinone and hindered phenols, such as 2,6-di-tert-butyl para cresol. Thiourea is an effective antioxidant when used with ethyl silicate.

In general, the range of concentration of deactivator used depends on whether a binary or ternary deactivator is employed and on the nature of the components of said medium. When a glycol is used about 1 to 5 percent of that material, by weight of the carrier, is useful; an antioxidant is generally used in amounts from about 0.10 to 1 percent by weight of the carrier; and ethyl silicate from about 0.1 to 2 percent by weight of the carrier. It has been found that by preparing deactivators including components from more than one class of additives that the benefits effected are not merely additive, rather they are considerably in excess of what would be expected from an observation of the behavior of each component of the deactivator.

The clays may be deactivated by any milling technique which insures adequate distribution and substantial homogeneity of the components of the pesticidal composition or the deactivated carrier, such techniques being well known to those skilled in the art. A solvent may be added to the components of the deactivator to ensure the adequate distribution of the deactivator on the carrier. The malathion or other thiophosphate-type toxicant may be impregnated on the carrier by milling, spraying, or solvent spraying techniques. Alternatively, the malathion may be added to the carrier together with the deactivator and be milled together.

The following examples and accompanying description are given only for the purpose of better illustrating the invention and are not to be construed as limiting the scope thereof.

Samples of attapulgite clay deactivated by the practice of the instant invention were impregnated with about 5 percent by weight of a technical grade of malathion, and the chemical stability of the sorbed toxicant of each sample was tested.

The clay used was Attaclay, a finely powdered grade of fuller's earth made and sold by Minerals and Chemicals Corporation of America and having the following specifications:

TYPICAL CHEMICAL COMPOSITION
(VOLATILE-FREE BASIS)

| | |
|---|---|
| $SiO_2$ percent | 67.0 |
| $Al_2O_3$ do | 12.5 |
| MgO do | 11.0 |
| $Fe_2O_3$ do | 4.0 |
| CaO do | 2.5 |
| Others do | 3.0 |
| Average particle size (microns) | 18 |
| Oil absorption (ASTM D281–31) | 99 |
| Free moisture content (as produced)—wt. percent determined at 220° F. until constant weight is achieved | 0.2 |
| pH (of water slurry) | 7.0–8.0 |
| Bulk density (lbs./cu. ft.) | 27–31 |

The clay samples are treated by mixing with various deactivators in a Hobart mixer, blending for 20 minutes, and then impregnating with 5.2 percent by weight of a technical grade of malathion by dripping the toxicant into the deactivated clay in the Hobart mixer while stirring and mixing the components together for about 20 minutes to effect substantial homogeneity. The pesticidal dust compositions thus formulated were subjected to an accelerated decomposition test by subjecting each sample in a sealed jar to a temperature of 40° C. for a month to accelerate any breakdown tendency of the toxicant during the storage period. While a compound may be unstable at 40° C., it may, nevertheless display good stability characteristics at room temperature. It has been observed that the results of such accelerated tests conducted to determine the stability of toxicants sorbed on a mineral carrier, such as Attaclay, correspond to the stability data for like compositions during storage for much longer periods of time at room temperature. At the end of the storage period during which the malathion compositions were held in sealed jars at about 40° C. for the purpose of studying the stability of the toxicant under the test conditions, the residual malathion concentration was ascertained by a method to be described and was recorded as the percentage of malathion chemically decomposed during the storage period. It has been found that malathion, impregnated on a sample of untreated Attaclay, at the 5% level, is decomposed to the extent percentage of about 70 percent under the test conditions above described.

The determination of malathion was made by the so-called "Carbon Tetrachloride Method," a colorimetric analytical procedure for the quantitative analysis of technical grade malathion. Malathion, S-(1,2 dicarbethoxyethyl)-O,O-dimethyl dithiophosphate, is decomposed by alkali in carbon tetrachloride-ethanol solution to O,O-dimethyl dithiophosphate, sodium fumarate, and ethanol. The sodium O,O-dimethyl dithiophosphate is then converted to the cupric complex which is soluble in carbon tetrachloride with the formation of an intense yellow color. The color intensity is proportional to the concentration of O,O-dimethyl dithiophosphoric acid and is measured colorimetrically at 418 mu, the absorption peak. The corresponding amount of insecticide is then ascertained by comparison with a standard curve prepared from known amounts of pure insecticide carried through the procedure. In the method dilute alkaline and acid washes are used to remove materials which would reduce cupric ions to cuprous ions. With dithiophosphoric acids cuprous ions form a colorless complex which is more stable than the yellow cupric complex.

To prepare the standard curve for malathion dissolve approximately 0.25 g. (weighed to 0.1 mg.) of pure malathion in 2-B ethanol contained in a 250 ml. volumetric flask. Dilute to the mark with 2-B ethanol. Mix well, transfer a 25 ml. aliquot to a second 250 ml. volumetric flask, and dilute to the mark with 2-B ethanol. One ml. of this solution is equivalent to 0.1 mg. of malathion. Carry 0, 2.5, 5, 10, 15, 20 and 25 ml. aliquots of the standard solution through the following procedure.

Transfer each aliquot to a 250 ml. separatory funnel containing sufficient 2-B ethanol to make a total volume of exactly 25 ml. of ethanol. Add 1 ml. of 1% $CS_2$ in 90 ml. of carbon tetrachloride. Mix well by swirling gently. Add 75 ml. of 2% NaCl solution (cooled to 15° C.), containing 1 ml. of 0.1 N NaOH and shake vigorously for exactly 1 minute. Allow the layers to separate and draw off the carbon tetrachloride layer into a clean, dry 250 ml. separatory funnel. Wash the aqueous layer once with 10 ml. of carbon tetrachloride by shaking for 15 seconds, allow the phases to separate and add the carbon tetrachloride layer to the main carbon tetrachloride solution, making certain that no water is transferred to the separatory funnel containing the carbon tetrachloride layers. Discard the alkaline salt solution.

Add 25 ml. of 2-B ethanol to the carbon tetrachloride extract and swirl to mix. Add 1 ml. of 6 N NaOH and shake exactly 1 minute. Immediately add 75 ml. of 2% NaCl solution (cooled to 15° C.) and shake for exactly 1 minute. Allow the phases to separate and discard the carbon tetrachloride layer. Wash the aqueous solution with 25 ml. of carbon tetrachloride by shaking for 30 seconds. Discard the carbon tetrachloride layer.

Add 25 ml. of carbon tetrachloride and 1 ml. of 7 N HCl to the aqueous layer and shake for 30 seconds. Allow the phases to separate and discard the carbon tetrachloride layer. Wash the aqueous solution with 25 ml. of carbon tetrachloride by shaking for 30 seconds. Drain off the carbon tetrachloride as completely as possible and discard.

To the aqueous phase remaining in the separatory funnel add from a pipette 50 ml. of carbon tetrachloride and then 2 ml. of copper sulfate solution. Immediately shake for 1 minute and allow the phases to separate. Immediately measure the absorption of the yellow solution at 420 mu using carbon tetrachloride as the reference.

Prepare the standard curve by plotting the absorption of each of the above aliquots vs. the mg. of malathion.

To analyze the powders containing malathion, a sample is weighed to the nearest milligram into a volumetric flask and diluted to the mark with 2-B ethanol. Serial dilutions are made so that the final amount of malathion analyzed is 1.0 to 1.5 mg.

Samples of pesticidal compositions containing about 5 percent by weight of malathion were chosen for observation since absolute decomposition, based on the original weight of malathion present would show up better than if observations were made on a higher concentration powder, such as 25 percent malathion. On an absolute basis, decomposition should be substantially identical for 5 percent and 25 percent malathion formulations. It is to be clearly understood that a 5 percent malathion concentration was chosen merely to magnify decomposition effects and not to restrict the scope of the invention to such a composition. An inexpensive, inactive, relatively nonsorptive carrier may be added to formulations to produce field strength compositions.

Example I

The results tabulated below demonstrate the adjuvant effect of an antioxidant on the ethyl silicate additive used as a deactivating medium for Attaclay impregnated with 5.2 percent by weight of a technical grade of malathion. All samples were held in sealed jars at 40° C. for one month.

| Glycol | Antioxidant | Ethyl Silicate | Percent Decomposition |
|---|---|---|---|
| None | ¼% 2246 | 1% Ethyl Silicate | 16 |
| None | 2% 2246 | None | 56 |
| None | None | 1% Ethyl Silicate | 45.6 |

2246 is a hindered phenolic antioxidant, an alkylated phenol, made and sold by American Cyanamid Company.

Example II

It has been found that at least 7 to 8 percent of triethylene glycol used alone as a deactivator is required, under test conditions, to reduce the decomposition percentage to about 15 percent. The following table illustrates the benefits which accrue from treating Attaclay with a binary deactivator including triethylene glycol and ethyl silicate.

| Glycol | Antioxidant | Ethyl Silicate | Percent Decomposition |
|---|---|---|---|
| 3% Triethylene Glycol | None | None | 28 |
| None | do | ½% Ethyl Silicate | 46 |
| 3% Triethylene Glycol | do | do | 7.3 |

These data show that the combination of ethyl silicate and glycol was appreciably more effective in inhibiting the decomposition of the toxicant than either of these ingredients used singly.

Example III

The following table illustrates the effect of adding an antioxidant to a glycol to provide a deactivator for Attaclay. It further illustrates the necessity for maintaining an adequate level of glycol in the mix.

| Glycol | Anti-oxidant | Ethyl Silicate | Percent Decomposition |
|---|---|---|---|
| None | 1% Thiourea | None | 50 |
| ½% Triethylene Glycol | do | do | 39.3 |
| 3% Triethylene Glycol | do | do | 11.0 |

Example IV

This example illustrates the efficacy of a ternary deactivator for Attaclay including a glycol, an antioxidant and ethyl silicate.

| Glycol | Antioxidant | Ethyl Silicate | Percent Decomposition |
|---|---|---|---|
| 3% Triethylene Glycol | ¼% 2246 | ½% Ethyl Silicate | 6.0 |

We claim:

1. A deactivated carrier for a thiophosphate-type toxicant comprising a sorptive clay having sorbed thereon triethylene glycol, ethyl silicate and an alkylated phenol.
2. A deactivated carrier for a thiophosphate-type toxicant comprising a sorptive clay having sorbed thereon triethylene glycol, ethyl silicate and thiourea.
3. A deactivated carrier for a thiophosphate-type toxicant comprising attapulgite clay having sorbed thereon triethylene glycol and ethyl silicate.
4. A deactivated carrier for a thiophosphate-type toxicant comprising a sorptive clay having sorbed thereon a polymer of ethylene glycol having from 2 to 3 ethylene groups and ethyl silicate.
5. A deactivated carrier for a thiophosphate-type toxicant comprising a sorptive clay having sorbed thereon triethylene glycol and ethyl silicate.
6. A deactivated carrier for a thiophosphate-type toxicant comprising a sorptive clay having sorbed thereon ethyl silicate and thiourea.

References Cited in the file of this patent

UNITED STATES PATENTS

| | | |
|---|---|---|
| 2,596,076 | Hook et al. | May 6, 1952 |
| 2,606,830 | Kamlet | Aug. 12, 1952 |
| 2,606,876 | Kamlet | Aug. 12, 1952 |
| 2,927,882 | Tradesman | Mar. 8, 1960 |

FOREIGN PATENTS

| | | |
|---|---|---|
| 488,428 | Great Britain | July 6, 1938 |
| 488,429 | Great Britain | July 6, 1938 |

OTHER REFERENCES

"Versene, The Modern Chelating Agent," Bersworth Chem. Co., Framingham, Mass., January 14, 1949 (24 pp.) (pp. 2, 3, 7 and title page relied on).

Sequestrene, Geigy Chem. Co., Ardsley, N.Y., 1952, 54 pp. (pp. 1, 17, 18 and 20 relied on).

Yost et al.: "Malathion and Its Formulations," Agr. Chem., September 1955, pp. 43–45, 137, 139.

Mfg. Chemist, vol. 27, No. 10, October 1956, p. 416.

Handbook of Insecticide Dust Diluents and Carriers, Dorland Books, Caldwell, N.Y., 1955, 208–212.

Frear: "Pesticide Handbook," College Science Pub., State College, Pa., 1954, pp. 103 and 164.